(12) United States Patent
Jin et al.

(10) Patent No.: US 6,238,497 B1
(45) Date of Patent: May 29, 2001

(54) HIGH THERMAL CONDUCTIVITY ALUMINUM FIN ALLOYS

(75) Inventors: Iljoon Jin; Kevin Gatenby; Willard Mark Truman Gallerneault; Toshiya Anami, all of Kingston (CA); Yoshito Oki, Fuji; Ichiro Okamoto, Aichi, both of (JP)

(73) Assignee: Alcan International Limited, Montreal (CA)

( * ) Notice: Subject to any disclaimer, the term of this patent is extended or adjusted under 35 U.S.C. 154(b) by 0 days.

(21) Appl. No.: 09/489,082

(22) Filed: Jan. 21, 2000

Related U.S. Application Data

(63) Continuation-in-part of application No. 09/121,638, filed on Jul. 23, 1998.

(51) Int. Cl.[7] .............................. C22C 21/00; C22F 1/04
(52) U.S. Cl. ........................ 148/551; 148/693; 148/437
(58) Field of Search .................................. 148/551, 552, 148/692, 696, 693, 437, 415; 420/540, 550, 551

(56) References Cited

U.S. PATENT DOCUMENTS

| | | |
|---|---|---|
| 3,989,548 | 11/1976 | Morris . |
| 4,021,271 | 5/1977 | Roberts ..................................... 148/2 |
| 4,126,487 | 11/1978 | Morris et al. . |
| 4,802,935 | 2/1989 | Crona et al. ........................ 148/437 |
| 5,217,547 | 6/1993 | Ishikawa et al. ..................... 148/552 |
| 5,681,405 | 10/1997 | Newton et al. ....................... 148/551 |
| 5,762,729 | * 6/1998 | Nishikawa et al. .................. 148/551 |

FOREIGN PATENT DOCUMENTS

| | | |
|---|---|---|
| 0 637 481 A1 | 2/1995 | (EP) . |
| 1 524 355 | 9/1978 | (GB) . |
| 3-100143 | 4/1991 | (JP) . |

OTHER PUBLICATIONS

Patent abstracts of Japan vol. 018, No. 344 (C–1218), Jun. 29, 1994 and JP 06 081064 A (Sky Alum Co Ltd.), Mar. 22, 1994.
Patent abstracts of Japan vol. 015, No. 385 (C–0871), Sep. 27, 1991 and JP 03 153835 A (Mitsubishi Alum Co Ltd.), Jul. 1, 1991.
Patent abstracts of Japan vol. 1995, No. 06, Jul. 31, 1995 and JP 07 070685 A (Mitsubishi Alum Co Ltd.), Mar. 14, 1995.

* cited by examiner

*Primary Examiner*—George Wyszomierski
*Assistant Examiner*—Janelle Combs-Morillo
(74) *Attorney, Agent, or Firm*—Cooper & Dunham LLP

(57) ABSTRACT

A method of producing an aluminum alloy fin stock material, comprising the steps of continuously strip casting an aluminum finstock alloy to form an as-cast strip, rolling the as-cast strip to form a sheet article of intermediate gauge, annealing the sheet article of intermediate gauge, and cold rolling the annealed sheet article of intermediate gauge to produce an aluminum finstock material of final gauge. The steps are carried out on a finstock alloy which comprises the following elements in weight percent: Fe 1.6 to 2.4; Si 0.7 to 1.1; Mn 0.3 to 0.6; Zn 0.3 to 2.0; Ti 0.005 to 0.040; incidental elements less than 0.05 each, total no more than 0.15; and the balance aluminum. The invention also relates to the finstock material so-produced which has good thermal conductivity, and is suitable for use in thin gauge (e.g. less than 100 $\mu$m, and preferably 60±10 $\mu$m).

18 Claims, 1 Drawing Sheet

HIGH THERMAL CONDUCTIVITY ALUMINUM FIN ALLOYS

CROSS-REFERENCE TO RELATED APPLICATIONS

This application is a Continuation-in-Part under 35 USC § 120 of patent application Ser. No. 09/121,638 filed Jul. 23, 1998, pending.

BACKGROUND OF THE INVENTION

I. Field of the Invention

This invention relates to an improved aluminum alloy product for use in making heat exchanger fins and, more particularly, to a fin stock material having high thermal conductivity.

II. Background Art

Aluminum alloys have long been used in the production of heat exchanger fins, e.g. for automotive radiators, condensers, evaporators etc. Traditional heat exchanger fin alloys are designed to give a high strength (UTS) after brazing, a good brazeability (high brazing temperature) and a good sag resistance during brazing. Alloys used for this purpose usually contain a high level of manganese. An example is the aluminum alloy AA3003. The thermal conductivity of such alloys is relatively low. Low thermal conductivity has not been a serious problem in the past because of the significant thickness of the finstock material. If the material is of suitable thickness it can conduct a significant quantity of heat, even if the coefficient of thermal conductivity of the alloy is low. However, in order to make vehicles lighter in weight, there is a demand for thinner finstock material, and this has emphasised the need for improved thermal conductivity. Obviously, thinner gauges tend to impede heat flux as they become thinner.

In addition, fin material properties demanded by the automotive heat exchanger industry require a low (more negative) corrosion potential than the alloys used in the tubes and other parts of the heat exchanger.

The inventors of the present invention have previously found that specific aluminum alloys are particularly suitable for use in finstock material (as disclosed in Applicants' prior unpublished U.S. patent application Ser. No. 09/121,638 filed Jul. 23, 1998, which is assigned to the same assignee as the present application, and which is incorporated herein by reference). These alloys contain Fe, Si, Mn, usually Zn and optionally Ti in particular content ranges. However, an improvement in the thermal conductivity of alloys of this kind would make these alloys even more useful in meeting the stringent demands of the automotive industry, particularly for finstock of thinner gauge.

SUMMARY OF THE INVENTION

It is an object of the invention to improve the property is of aluminum finstock material.

Another object of the present invention to produce a new aluminum alloy fin stock that has a high thermal conductivity.

Another object of the invention is to make it possible to reduce the gauge of aluminum finstock material without compromising the performance of those materials.

Another object of the invention is to improve the thermal conductivity of aluminum finstock alloys containing Fe, Si, Mn, Zn and optionally Ti whilst achieving good strength, brazeability and low (more negative) corrosion potentials.

According to one aspect of the invention, there is provided a method of producing an aluminum alloy fin stock alloy material, comprising the steps of continuously strip casting the alloy to form a cast strip, rolling the strip to form a sheet article of intermediate gauge, annealing the sheet article of intermediate gauge, and cold rolling the sheet article of intermediate gauge to form an aluminum finstock alloy material of final gauge, wherein said steps are carried out on an alloy which comprises the following elements in weight percent:

| | |
|---|---|
| Fe | 1.6 to 2.4 |
| Si | 0.7 to 1.1 |
| Mn | 0.3 to 0.6 |
| Zn | 0.3 to 2.0 |
| Ti (optional) | 0.005 to 0.040 |
| Incidental elements | less than 0.05 each, total no more than 0.15 |
| Al | balance. |

The invention also relates to an aluminum alloy finstock material produced by the above method, particularly finstock material having a thickness of 100 μm or less, preferably 80 μm or less, and ideally 60 ±10 μm.

The present invention produces a novel fin stock material that is suitable for manufacturing brazed heat exchangers using thinner fins that previously possible. This is achieved while retaining adequate thermal conductivity and strength in the fins to permit their use in heat exchangers.

The alloys incorporate higher amounts of Zn, Si and/or Mn than would normally be employed for alloys of this kind and yet thermal conductivity levels can be maintained by employing compensating elevated amounts of iron.

DETAILED DESCRIPTION OF THE INVENTION

Figure 1:
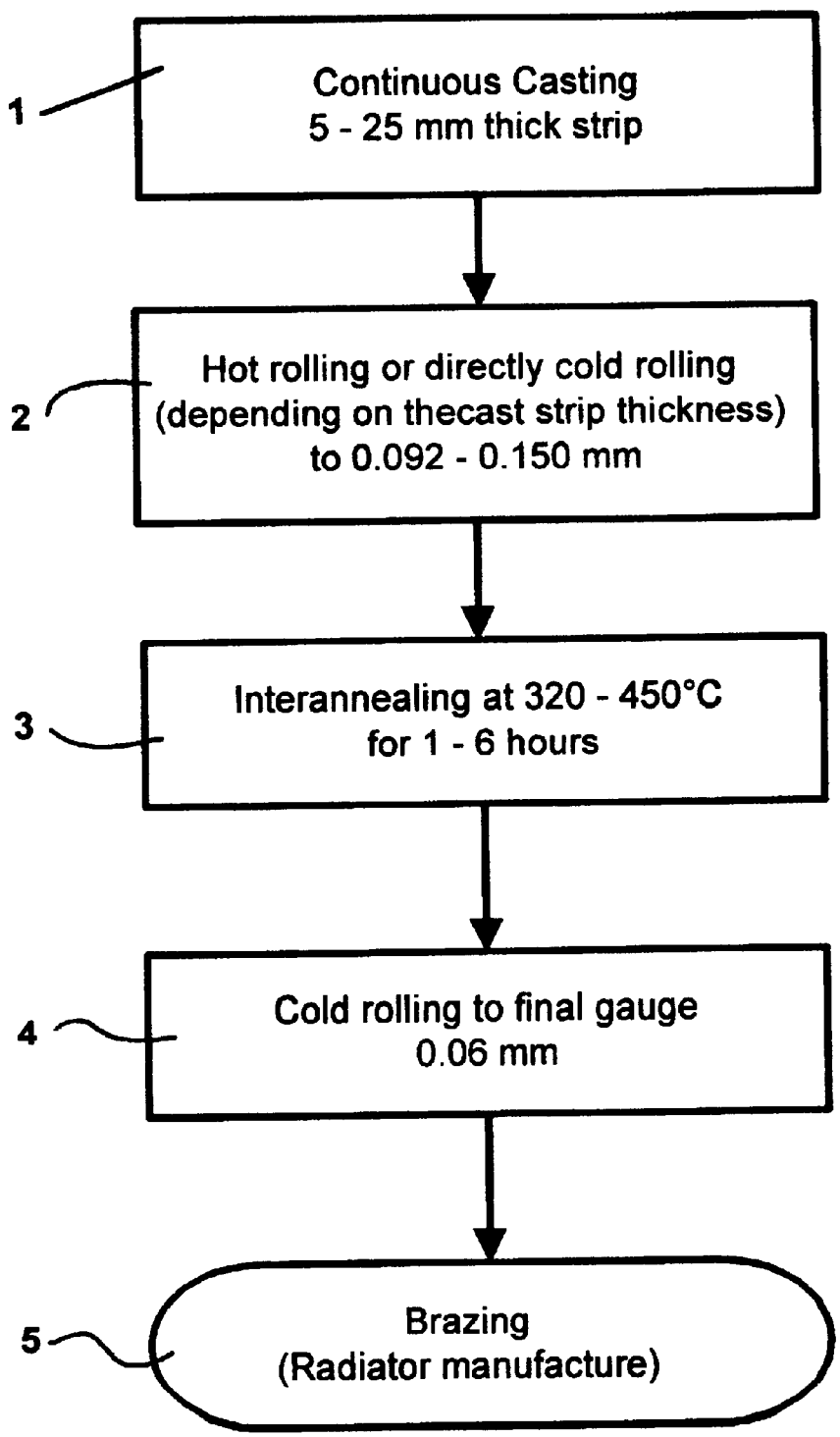
FIG. 1 is a flow chart showing the steps in a preferred method of producing finstock material according to a preferred form of the present invention, including casting, rolling, annealing and final brazing.

In finstock based on aluminum and alloying elements including Zn, Mn, Si and Fe, the properties of the material are adjusted by varying the elemental composition. It is generally desirable to obtain a material with high strength and low (more negative) corrosion potential. For example, the corrosion potential is made more negative by increasing the amount of Zn in the alloy (and this serves to provide overall improved corrosion performance for heat exchangers using fins of such material). However, increasing the amount of Zn has a negative effect on the thermal conductivity of the finstock. Similarly, increasing the amount of Mn and Si to improve the material strength (UTS) after brazing has a similar negative effect on thermal conductivity. This becomes a problem for the newer finstock materials where a high thermal conductivity is required to permit thinner fins to be fabricated.

The present invention is based on the unexpected finding that the reduction of conductivity resulting from increases of zinc content may be compensated for by corresponding increases in the iron content of the alloy. Moreover, it has been found that increases or iron may similarly compensate for reductions of thermal conductivity caused by increases of silicon and manganese. Further, if a thermal conductivity treater than that of the base alloy is desired, as well as other improved properties, the addition of Fe may be greater than the "compensating" amount based on the above relationships. Thus the invention uses greater amounts of iron than heretofore used to compensate for the Zn, Mn and Si levels required to obtain good strength, brazeability and corrosion potentials, and also permits the levels of these elements to be further increased than heretofore possible.

The reason why the addition of Fe increases the conductivity of the alloys in compensation for increases of other elements is not known. However, without wishing to be bound by a particular theory, it is possible that the excess Fe enhances the decomposition of the supersaturated matrix alloy formed by casting during the subsequent rolling and interanneal stages (processing route), thus reducing the solute content in the matrix more effectively than would be the case in the absence of the extra Fe.

In addition to the above considerations, the various elements of the alloy, and their respective amounts, may be chosen with these further considerations in mind.

The iron in the alloy forms intermetallic particles of during casting that are relatively small and contribute to particle strengthening. With iron contents above 2.4 wt. %, large primary intermetallic phase particles are formed which prevent rolling to the desired very thin fin stock gauges. The onset of formation of these particles is dependent on the exact conditions of casting used, and it is therefore preferable to use iron less than 2.0% to ensure good material under the widest possible processing conditions. A lower limit of 1.6% Fe is needed to ensure there is adequate Fe present to provide compensating effects for the Zn, Mn and Si additions. Fe also forms strengthening particles in the alloy and the lower limit ensures an adequate number are present. If desired, the amount or iron employed in a particular alloy may be chosen to compensate completely for any reductions in thermal conductivity brought about by higher than normal concentrations of Zn, Si and/or Mn. Such amounts of iron may be referred to as compensating amounts. However, amounts above or below the compensating amounts may be used within the above range, if desired and if variations of the thermal conductivity from a desired level may be tolerated.

The silicon in the alloy in the range of 0.7 to 1.1 wt. % contributes to both particle and solid solution strengthening. Below 0.7% there is insufficient silicon for this strengthening purpose while above 1.1%, the conductivity is significantly reduced despite compensation from increased amounts of Fe. More significantly, at high silicon contents the alloy melting temperature is reduced to the point at which the material cannot be brazed. To provide for optimum strengthening, silicon in excess of 0.8% is particularly preferred.

When manganese is present in the range of 0.3 to 0.6%, it contributes significantly to the solid solution strengthening and to some extent to particle strengthening of the material. Below 0.3% the amount of manganese is insufficient for the purpose. Above 0.6%, the presence of manganese in solid solution becomes strongly detrimental to conductivity despite compensation from increased amounts of Fe.

Zinc in the range 0.3 to 2.0% allows for the adjustment of corrosion potential of the fin material over a wide range. However, it is preferable to have no more than 1.5% Zn present because of its ultimately negative effect on conductivity, even at the higher Fe levels permitted in the present case. It is also preferable to have Zn greater than 0.6% to ensure an adequate (negative) corrosion potential is achieved, and this higher limit is more than adequately compensated by the higher Fe of this invention.

The titanium, when present in the alloy was $TiB_2$, acts as a grain refiner during casting. When present in amounts greater than 0.04%, it tends to have a negative impact on conductivity.

Any incidental elements in the alloy should be less than 0.05% each and less than 0.15% in aggregate. In particular, magnesium must be present in amounts of less than 0.10%, preferably less than 0.05%, to insure brazeability by the Nocolok® process. Copper must be kept below 0.05% because it has a similar effect to manganese on conductivity and it also causes pitting corrosion.

Given this range of compositions of the alloys, it should be noted that, in order to produce a finstock sheet material of desirable characteristics, the alloy must be cast and formed under quite specific conditions.

A preferred processing route is shown in FIG. 1 of the accompanying drawings in which a number of steps are shown in the sequence in which they are carried out. As shown in step 1, the alloy is first cast by a continuous process (e.g. belt casting) to form a continuous alloy as-cast strip that is normally 3–30 mm in thickness (preferably at least 5 mm in thickness). during the strip casting, the average cooling rate should preferably be greater than 10° C./sec. It is preferred that the average cooling rate be less than 250° C./sec., most preferably less than 200° C./sec. The cast strip is rolled to an intermediate gauge (step 2). This may be carried out by cold-rolling, but the as-cast strip may, if necessary, be hot rolled to a re-roll gauge (of 1 to 5 mm in thickness). If this is required, the hot rolling must be done without prior homogenisation. The strip of intermediate thickness is then annealed (step 3), and cold rolled to the final gauge (step 4). The resulting finstock sheet material of final gauge may then be subjected to brazing during the manufacture of heat exchangers (step 5). This is normally carried out by radiator manufacturers rather than alloy sheet fabricators (a fact represented by the different shape of the boundary surrounding step 5).

The average cooling rate mentioned in the description above means the cooling rate average through the thickness of the as cast slab, and the cooling rate is determined from the average interdendritic cell spacing taken across the thickness of the as cast slab as described for example in an article by R. E. Spear, et al. in the Transactions of the American Foundrymen's Society, Proceedings of the Sixty-Seventh Annual Meeting, 1963, Vol. 781, Published by the American Foundrymen's Society, Des Plaines, Ill., USA, 1964, pages 209 to 215. The average interdendritic cell size corresponding to the preferred average cooling rate is in the range 7 to 15 microns.

In the casting procedure, if the average cooling rate is less than 10° C./sec., the intermetallic particles formed during casting will be too large and will cause rolling problems. A lower cooling rate will generally involve DC casting and homogenisation and under such circumstances, elements come out of the supersaturated matrix alloy and the solution strengthening mechanism is reduced, resulting in material of inadequate strength. This means that a continuous strip casting process should be used. A variety of such processes exist, including roll casting, belt casting and block casting. Belt and block casting both operate at lower maximum average cooling rates of less than 250° C./sec., more preferably less than 200° C./sec, and these are particularly preferred as they are more capable of casting high Fe alloys without defects.

According to a particularly preferred feature of the invention, the fin stock is produced by continuous strip casting the alloy to form a strip of 5 to 30 mm thick at a cooling rate of 10° C./sec. or higher, but less than 250° C./sec., optionally hot rolling the as-cast strip to 1–5 mm thick sheet, cold rolling to 0.08–0.20 mm thick sheet, annealing at 340–450° C. for 1–6 hours, and cold rolling to final gauge (0.05–0.10 mm). It is preferred that the as-cast strip enter the hot rolling process at a temperature of between about 400–550° C. The hot rolling step may not be needed for as-cast strips that are close to the minimum thickness. The final cold rolling should preferably be done using less than 60% reduction and more preferably less than 50% reduction. The amount of cold rolling in the final rolling step is adjusted to give an optimum grain size after brazing, i.e., a grain size of 30 to 80 $\mu$m, preferably 40 to 80 $\mu$m. If the cold rolling reduction is too high, the UTS after brazing becomes high, but the grain size becomes too small and the brazing temperature becomes low. On the other hand, if the cold reduction is too low, then the brazing temperature is high but the UTS after brazing is too low. The preferred method of continuous strip casting is belt casting.

After casting, the strip may then be hot rolled, or directly cold rolled (depending on the thickness of the as-cast strip) to an intermediate thickness (generally 0.092 to 0.150 mm). At this thickness, the rolled strip is subjected to an interanneal at a temperature in the range of 320 to 450° C. for 1 to 6 hours. Following cooling, the interannealed strip is then subjected to cold rolling to final gauge (preferably 0.06 mm, if thin finstock product is desired). This product is intended for heat exchanger manufacturing and is subjected to brazing during the heat exchanger manufacturing step.

The strip product formed from this alloy according to the present invention has a strength (UTS) after brazing greater than about 127 MPa, preferably greater than about 130 MPa, a conductivity after brazing greater than 49.0% IACS, more preferably greater than 49.8% IACS, most preferably greater than 50.0% IACS and brazing temperature greater than 595° C., preferably greater than 600° C.

These strip properties are measured under simulated brazed conditions as follows.

The UTS after brazing is measured according to the following procedure that simulates the brazing conditions. The processed fin stock in its final as rolled thickness (e.g. after rolling to 0.06 mm in thickness) is placed in a furnace preheated to 570° C. then heated to 600° C. in approximately 12 minutes, held (soaked) at 600° C. for 3 minutes, cooled to 400° C. at 50° C./min. Then air-cooled to room temperature. The tensile test is then performed on this material.

The conductivity after brazing is measured as electrical conductivity (which directly corresponds to thermal conductivity) on a sample processed as for the UTS test which simulates the brazing conditions, using conductivity tests as described in JIS-H0505.

EXAMPLE

A series of experimental alloys were cast on the laboratory twin belt caster and then rolled to final gauge under conditions as described above. The alloy compositions and conductivity in the "after brazed" state are shown in Table 1.

TABLE 1

Alloy Compositions (in wt. %) and Conductivity

| Si | Fe | Mn | Zn | Conductivity (% IACS) |
|---|---|---|---|---|
| 0.97 | 1.45 | 0.31 | 0.51 | 50.3 |
| 0.96 | 1.53 | 0.42 | 0.46 | 49.8 |
| 0.86 | 1.54 | 0.41 | 0.46 | 50.7 |
| 0.84 | 1.85 | 0.42 | 0.47 | 51.4 |
| 0.75 | 1.49 | 0.41 | 0.47 | 50.5 |
| 0.80 | 1.51 | 0.52 | 0.46 | 49.7 |
| 1.02 | 1.50 | 0.32 | 0.45 | 50.2 |
| 0.85 | 1.44 | 0.39 | 0.54 | 51.1 |
| 0.83 | 1.47 | 0.38 | 0.92 | 50.3 |
| 0.89 | 1.52 | 0.38 | 1.43 | 49.6 |
| 0.83 | 0.93 | 0.37 | 0.93 | 49.5 |
| 0.86 | 0.29 | 0.41 | 0.88 | 48.3 |
| 0.87 | 1.41 | 0.41 | 0.95 | 49.4 |
| 0.86 | 1.68 | 0.41 | 0.95 | 50.1 |
| 0.90 | 1.40 | 0.29 | 1.08 | 49.9 |
| 0.98 | 1.73 | 0.34 | 1.15 | 49.6 |
| 1.04 | 1.90 | 0.45 | 1.09 | 49.3 |
| 1.02 | 2.22 | 0.55 | 0.98 | 49.4 |

A multiple regression analysis was run on the resulting materials and the effect of the elements on the conductivity was determined from the test results, the effect of 0.1 wt. % increase in alloying elements (Mn, Si, Fe and Zn) on the conductivity and in the post-brazed state were determined. This is shown in Table 2.

TABLE 2

Effect of 0.1 wt. % Addition of Mn, Si, Fe, and Zn on the Post-braze Conductivity

| | Alloy Elements | | | |
|---|---|---|---|---|
| | Mn | Si | Fe | Zn |
| Conductivity (% IACS) | −0.65 | −0.39 | +0.23 | −0.77 |

From Table 2, it can be seen that whereas Mn, Si and Zn will all result in decreased conductivity, the addition of Fe results in an unexpected increase in conductivity.

What is claimed is:

1. A method of producing an aluminum alloy fin stock material, comprising the steps of continuously strip casting an aluminum finstock alloy to form an as-cast strip, rolling the as-cast strip to form a sheet article of intermediate gauge, annealing the sheet article of intermediate gauge, and cold rolling the annealed sheet article of intermediate gauge to produce an aluminum finstock material of final gauge, wherein the steps are carried out on the finstock alloy comprises the following elements in weight percent:

| | |
|---|---|
| Fe | 1.6 to 2.4 |
| Si | 0.7 to 1.1 |
| Mn | 0.3 to 0.6 |
| Zn | 0.3 to 2.0 |
| Ti (optional) | 0.005 to 0.040 |
| Incidental elements | less than 0.05 each, total no more than 0.15 |
| Al | balance. |

2. The method of claim 1, wherein the alloy contains 0.005 to 0.02 wt. % Ti.

3. The method of claim 1, wherein the alloy contains less than 2.0 wt. % Fe.

4. The method of claim 1, wherein the alloy contains more than 0.8 wt. % Si.

5. The method of claim 1, wherein the alloy contains more than 0.6 wt. % Zn.

6. The method of claims 1, wherein the alloy is subjected to a cooling rate of at least 10° C./second during casting.

7. The method of claim 6, wherein cooling rate is less than 250° C./sec.

8. The method of claim 1, wherein the cast strip is hot rolled, without prior homogenisation, to a re-roll strip prior to cold rolling.

9. The method of claim 1, wherein the alloy is cast at a thickness of no more than about 30 mm.

10. The method of claim 9, wherein the alloy is cast at a thickness of about 3–30 mm.

11. The method of claim 10, wherein the cast strip is hot rolled, without prior homogenisation, to form a sheet article 1–5 mm thick.

12. The method of claim 1, wherein the hot rolled sheet article is annealed at a temperature of 340–450° C. for 1–6 hours.

13. The method of claim 1, wherein the annealed sheet article is cold rolled to a final strip gauge of less than 100 $\mu$m.

14. The method of claim 1, wherein the annealed sheet article is cold rolled to a final gauge of less than 80 $\mu$m.

15. The method of claim 1, wherein the annealed sheet article is cold rolled to a final gauge of 60±10 $\mu$m.

16. The method of claim 1, wherein the annealed sheet article is cold rolled to a final sheet article using a reduction of less than 60%.

17. The method claim 1, wherein the strip casting is conducted using a belt caster.

18. The method of claim 1, wherein the strip article of final gauge has a conductivity after brazing greater than 50.0% IACS.

* * * * *